Patented Dec. 29, 1931

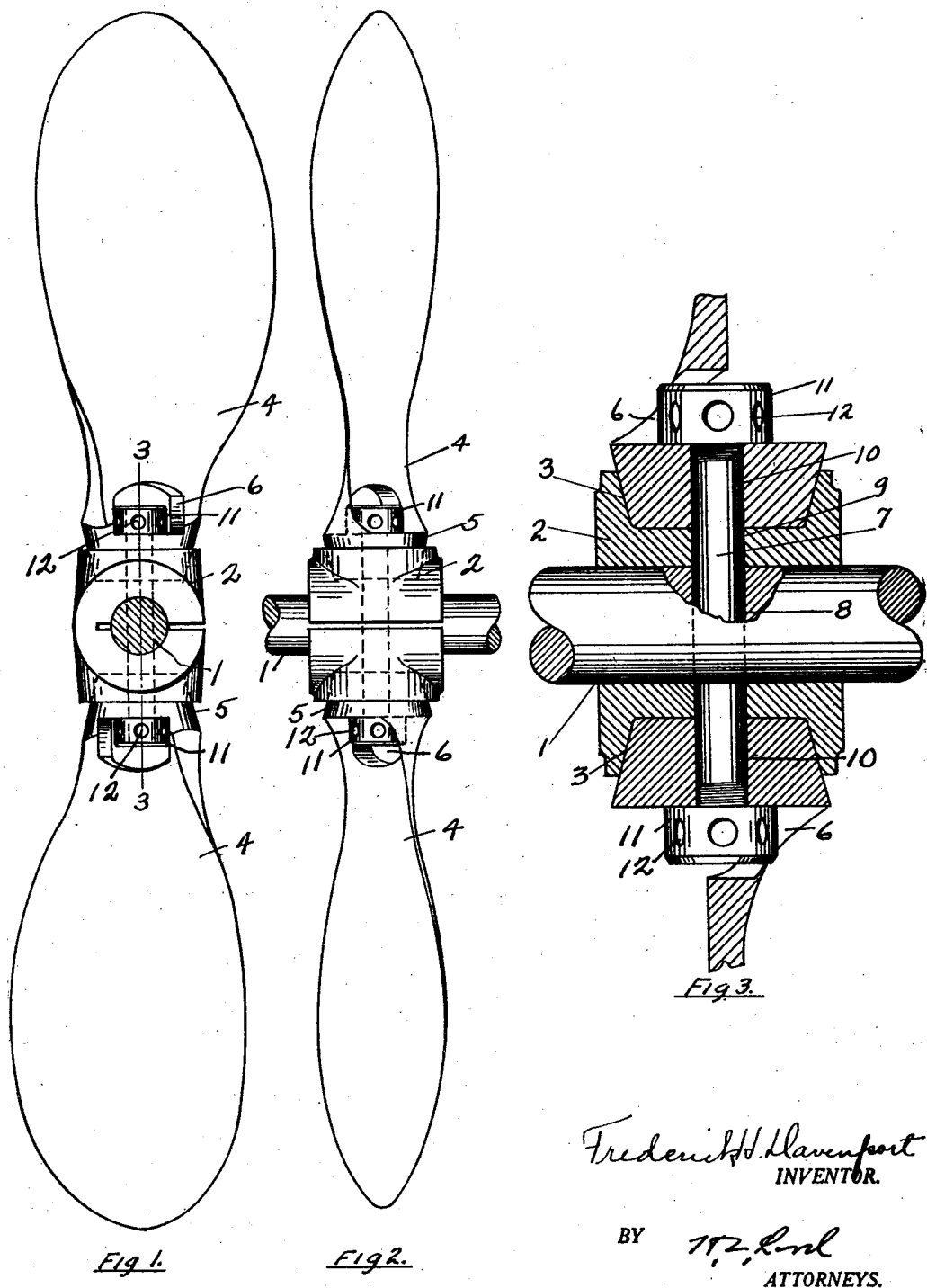

1,839,013

UNITED STATES PATENT OFFICE

FREDERICK H. DAVENPORT, OF MEADVILLE, PENNSYLVANIA

PROPELLER

Application filed May 19, 1930. Serial No. 453,532.

With different types of propellers, such for instance as water propellers, or fans, it is often desirable to change the pitch of the blade. The present invention is designed to accomplish this in a convenient and rugged manner. Features and details of the invention will appear from the specification and claims.

A preferred embodiment of the invention is illustrated in the accompanying drawings as follows:—

Fig. 1 shows an end elevation of the propeller.

Fig. 2 a side elevation of the propeller.

Fig. 3 an enlarged sectional view of the hub and propeller blade attaching means on the line 3—3 in Fig. 1.

1 marks the shaft on which the propeller is mounted, 2 the propeller hub, and 3 tapered radially extending sockets in the hub. The hub is slotted and thus made contractible so that it can be clamped upon the shaft.

Propeller blades 4 are provided with projections 5 which are tapered to conform to the tapers of the sockets 3. These projections extend into the sockets and fit therein. Cross slots 6 extend through the blades over the projections. A clamping bolt 7 extends through an opening 8 in the shaft, an opening 9 in the hub, and openings 10 in the projections 5. The bolt is threaded on both ends and provided with nuts 11 which are arranged in the slots 6. The nuts are preferably provided with radial openings 12 for receiving a spanner wrench.

By loosening the bolt the fan blades may be turned to any pitch desired and by merely securing the bolts the fan blades are clamped in their adjustment and secured to the hub. The bolt also locks the hub on the shaft.

What I claim as new is:—

1. In a propeller, the combination of a hub having radial sockets therein; a shaft on which the hub is mounted; propeller blades having projections rotatably fitting into the sockets; and a bolt extending through the shaft, the hub and the projections clamping the projections in the sockets and locking the hub on the shaft.

2. In a propeller, the combination of a hub having radial sockets therein, said hub being slotted to make the hub contractible; a shaft on which the hub is mounted; propeller blades having projections rotatably fitting into the sockets; and a bolt extending through the shaft, the hub and the projections clamping the projections in the sockets and locking the hub on the shaft.

In testimony whereof I have hereunto set my hand.

FREDERICK H. DAVENPORT.